United States Patent
Cheng et al.

(10) Patent No.: US 12,255,651 B1
(45) Date of Patent: Mar. 18, 2025

(54) RECONFIGURABLE RING OSCILLATOR (RO) PHYSICAL UNCLONABLE FUNCTION (PUF)

(71) Applicant: INTERNATIONAL BUSINESS MACHINES CORPORATION, Armonk, NY (US)

(72) Inventors: Kangguo Cheng, Schenectady, NY (US); Julien Frougier, Albany, NY (US); Carl Radens, LaGrangeville, NY (US); Ruilong Xie, Niskayuna, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 23 days.

(21) Appl. No.: 18/494,379

(22) Filed: Oct. 25, 2023

(51) Int. Cl.
*H03K 3/03* (2006.01)
*G06F 7/58* (2006.01)
*G06F 21/73* (2013.01)
*H03K 3/84* (2006.01)
*H04L 9/32* (2006.01)

(52) U.S. Cl.
CPC .............. *H03K 3/0315* (2013.01); *G06F 7/58* (2013.01); *G06F 21/73* (2013.01); *H03K 3/84* (2013.01); *H04L 9/3278* (2013.01)

(58) Field of Classification Search
CPC ........ H03K 3/0315; H03K 3/84; G06F 21/73; G06F 7/588; G06F 7/582; G06F 7/58; H04L 9/3278; H04L 9/0866; H04L 2209/12
See application file for complete search history.

(56) References Cited

U.S. PATENT DOCUMENTS

| | | |
|---|---|---|
| 9,762,241 B1 * | 9/2017 | Augustine ................ H03K 3/84 |
| 9,806,718 B2 | 10/2017 | Wallrabenstein |
| 9,916,884 B2 | 3/2018 | Augustine et al. |
| 10,812,084 B2 | 10/2020 | Strukov et al. |
| 11,490,225 B2 | 11/2022 | Conus |
| 11,545,963 B1 | 1/2023 | Zick |
| 2018/0337777 A1 | 11/2018 | Shieh et al. |

(Continued)

OTHER PUBLICATIONS

Cui, Yijun, et al. "Lightweight configurable ring oscillator PUF based on RRAM/CMOS hybrid circuits." IEEE Open Journal of Nanotechnology 1 (2020): 128-134. (Year: 2020).*

(Continued)

*Primary Examiner* — Ryan Johnson
(74) *Attorney, Agent, or Firm* — KONRAD, RAYNES, DAVDA & VICTOR LLP; Janaki K. Davda

(57) ABSTRACT

Provided is a reconfigurable Ring Oscillator (RO) Physical Unclonable Function (PUF), which comprises a NAND gate with a first input line and a second input line and a series of inverters with at least one memory cell placed between two inverters of the series of inverters, where an output of a last inverter provides input to the second input line, and where the memory cell comprises a Field Effect Transistor (FET). In addition, the reconfigurable RO PUF comprises a frequency counter, where the output of the last inverter provides input to the frequency counter. In normal operation mode, the first input line is on to enable ring oscillation and the FET is off. In reconfiguration mode, the first input line is off and the FET is on to enable reconfiguration.

20 Claims, 17 Drawing Sheets

(56) References Cited

U.S. PATENT DOCUMENTS

2020/0145008 A1   5/2020   Strukov et al.
2021/0051443 A1   2/2021   Conus

OTHER PUBLICATIONS

Herder, et al., "Physical Unlcloneable Functions and Applications: A Tutorial," Proceedings of the IEEE, vol. 102, No. 8, Aug. 2014, 16 pp.
"Apparatus and Methodology for Test-Time Reduction for Ring Oscillator Measurements," IP.com, IP.com No. IPCOM000184081D; Jun. 10, 2009, 5 pp.
"Layout Design for Quick Ring Oscillator Yield Ramp-Up," IP.com, IP.com No. IPCOM000263916D; Oct. 20, 2020, 5 pp.
"System and Method for Automatic Reconfigurable Logic Offloading Compilation," IP.com, IP.com No. IPCOM000266861D; Aug. 27, 2021, 4 pp.
Kursawe, et al., "Reconfigurable Physical Un-Cloneable Functions—Enabling, Technology for Tamper-Resistant Storage," IEEE, 2009, 8 pp.
"Physical Unclonable Function", Intrinsic ID, [online] [retrieved on Jul. 20, 2023] https://www.intrinsic-id.com/physical-unclonable-function/, 2 pp.

\* cited by examiner

RECONFIGURABLE RING OSCILLATOR (RO) PHYSICAL UNCLONABLE FUNCTION (PUF)

BACKGROUND

Embodiments of the invention relate to a reconfigurable Ring Oscillator (RO) Physical Unclonable Function (PUF). Certain embodiments of the invention relate to a reconfigurable RO PUF for AI applications.

Emerging memories, such as Phase Change Memory (PCM) and Resistive Random Access Memory (RRAM), are being explored for a variety of Artificial Intelligence (AI) applications. For example, weights of a Neural Network (NN) may be represented by the conductance of the memory cells of those memories.

Some NNs are very large. Training such a large NN requires a large amount of resources. For example, using a cloud environment to train a NN may provide a cost-effective solution for the training.

It is often the case that a NN is constantly updated (trained) with new data, even after a NN is originally trained. Multiple training sessions are common.

For a client who uses the cloud architecture to train a NN, maintaining security and confidentiality of data used for training is important. Thus, authentication of the cloud platform is important.

SUMMARY

In accordance with certain embodiments, a reconfigurable Ring Oscillator (RO) Physical Unclonable Function (PUF) is provided, which comprises a NAND gate with a first input line and a second input line and a series of inverters with at least one memory cell placed between two inverters of the series of inverters, where an output of a last inverter provides input to the second input line, and where the memory cell comprises a Field Effect Transistor (FET). In addition, the reconfigurable RO PUF comprises a frequency counter, where the output of the last inverter provides input to the frequency counter. In normal operation mode, the first input line is on to enable ring oscillation and the FET is off. In reconfiguration mode, the first input line is off and the FET is on to enable reconfiguration.

In accordance with yet other embodiments, an apparatus for a reconfigurable Ring Oscillator (RO) Physical Unclonable Function (PUF) comprises a pair of cross-coupled reconfigurable RO PUFs comprising a first reconfigurable RO PUF and a second reconfigurable RO PUF, wherein the first reconfigurable RO PUF is comprised of a first series of inverters, a first memory cell, and a first NAND gate comprising a first enable port, wherein the second reconfigurable RO PUF is comprised of a second series of inverters, a second memory cell, and a second NAND gate comprising a second enable port, wherein an output of an intermediate stage of the first reconfigurable RO PUF is coupled to the second enable port of the second reconfigurable RO PUF, and wherein an output of an intermediate stage of the second reconfigurable RO PUF is coupled to the first enable port of the first reconfigurable RO PUF. In addition, the reconfigurable RO PUF comprises a sampling unit coupled to the pair of cross-coupled reconfigurable RO PUFs and configured to sample the outputs of the first reconfigurable RO PUF and the second reconfigurable RO PUF to generate a random number.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

An Integrated Circuit (IC) (i.e., a "chip") is a single unit formed by an assembly of electronic components, in which devices (e.g., transistors, diodes, capacitors, and resistors)

and their interconnections are built up on a thin substrate of semiconductor material (typically silicon). The resulting circuit is a "chip,".

Each device, such as each transistor, in the IC has slightly different physical properties. Variations of these slightly different physical properties lead to small but measurable differences of electronic properties, such as transistor threshold voltages and gain factor. Process variations are not fully controllable during manufacturing of the IC, and these physical properties cannot be copied or cloned.

A Ring Oscillator (RO) may be described as a device having an odd number of inverters in a ring, whose output oscillates between two voltage levels, representing true ("1") and false ("0"). The inverters are attached in a chain, and the output of the last inverter is fed back into the first inverter of the chain.

A Physical Unclonable Function (PUF) may be described as circuitry within the IC that converts the variations into a digital pattern of zeros and ones, and the digital pattern ("digital fingerprint") is unique for that specific IC and repeatable over time. The pattern may be used as a "root" key and may be reconstructed without storing the pattern, which increases security. That is, the PUF, for a given input and conditions (challenge), provides a physically defined "digital fingerprint" output (response) that serves as a unique identifier for the IC.

Figure 1:
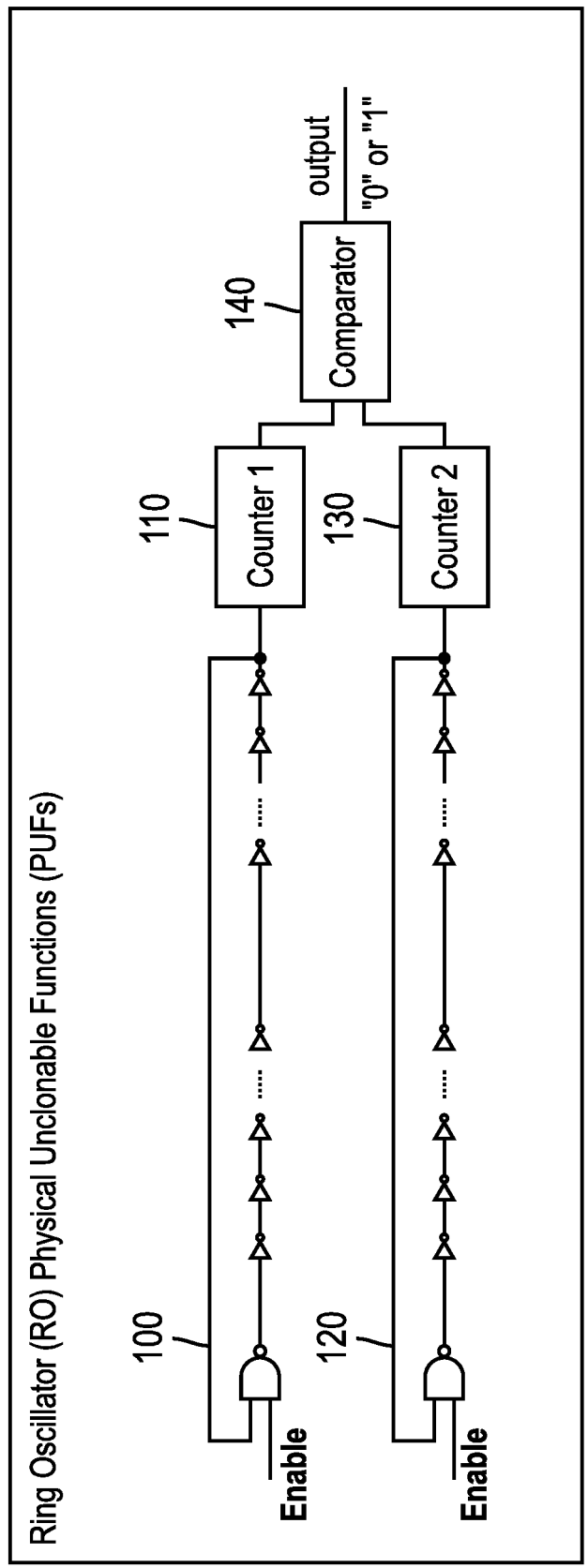
FIG. 1, a prior art diagram, illustrates a Ring Oscillator (RO) Physical Unclonable Function (PUF).

FIG. 1, a prior art diagram, illustrates RO PUFs 100, 120. A first RO PUF 100 consists of a first NAND gate coupled to a series (i.e., a chain) of inverters, with the last inverter of the series coupled to a counter 110. A second RO PUF 120 consists of a second NAND gate coupled to a series of inverters, with the last inverter of the series coupled to a counter 130. The counters 110, 130 are coupled to a frequency counter 140 that outputs zero or one. In particular, each of the counters 110, 130 counts the number of rising or falling edges for the transistor coupled to that counter 110, 130 during a predefined amount of time. Afterwards, the state of the counters 110, 130 are sampled and compared by the comparator 140 to generate a binary response. This is done multiple times, and a series of zeroes and ones from the comparator 140 provide the digital fingerprint. However, such an RO PUFs 100, 120 are not configurable. In addition, entropy depends on a single variation source—the inverter delay.

Embodiments provide a reconfigurable RO PUF. This is useful for security reasons, where each challenge-response pair of reconfigurable RO PUFs is used once to avoid "replay" attack. As more and more challenge-response pairs are used, it is desired to re-generate new challenge-response pairs. This is also useful in case the reconfigurable RO PUF is compromised (e.g., in case a password is compromised).

Embodiments provide a circuit structure and a method for forming a reconfigurable RO PUF. Each reconfigurable RO PUF cell comprises a Ring Oscillator (RO) and at least one memory element, such as PCM or RRAM. The reconfiguration of the reconfigurable RO PUF comes from the fact that at certain programming conditions those memory elements exhibit large variability in resistance (or inversely conductance). Embodiments take advantage of the large variability to make an RO PUF reconfigurable.

Figure 2:
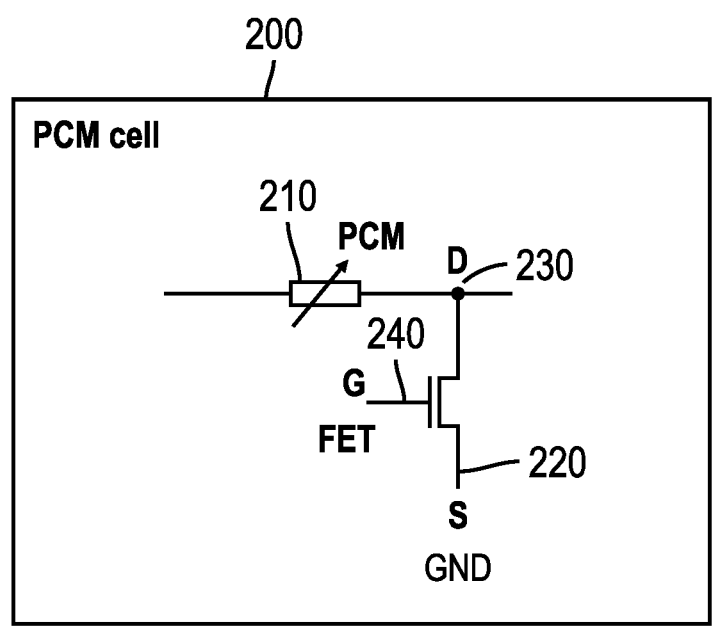
FIG. 2 illustrates a Phase Change Memory (PCM) cell in accordance with certain embodiments.

FIG. 2 illustrates a Phase Change Memory (PCM) cell 200 in accordance with certain embodiments. The PCM cell 200 has PCM material 210 on a circuit. A programming transistor (a Field Effect Transistor (FET)) 220 is connected to the circuit after the PCM material 210. The FET may be described as a type of transistor that uses an electric field to control the flow of current. The FET has three terminals: a source (S) 220, through which the charge enters; a drain (D) 230 through which the charge leaves the channel; and a gate (G), which modulates the charge conductivity. The source (S) 220 is connected to ground (GND).

In certain embodiments, the PCM cell 200 is an enabling technology for non-volatile electrical data storage at the nanometer scale. A PCM cell 200 consists of a small active volume of phase-change material between two electrodes.

Figure 3:
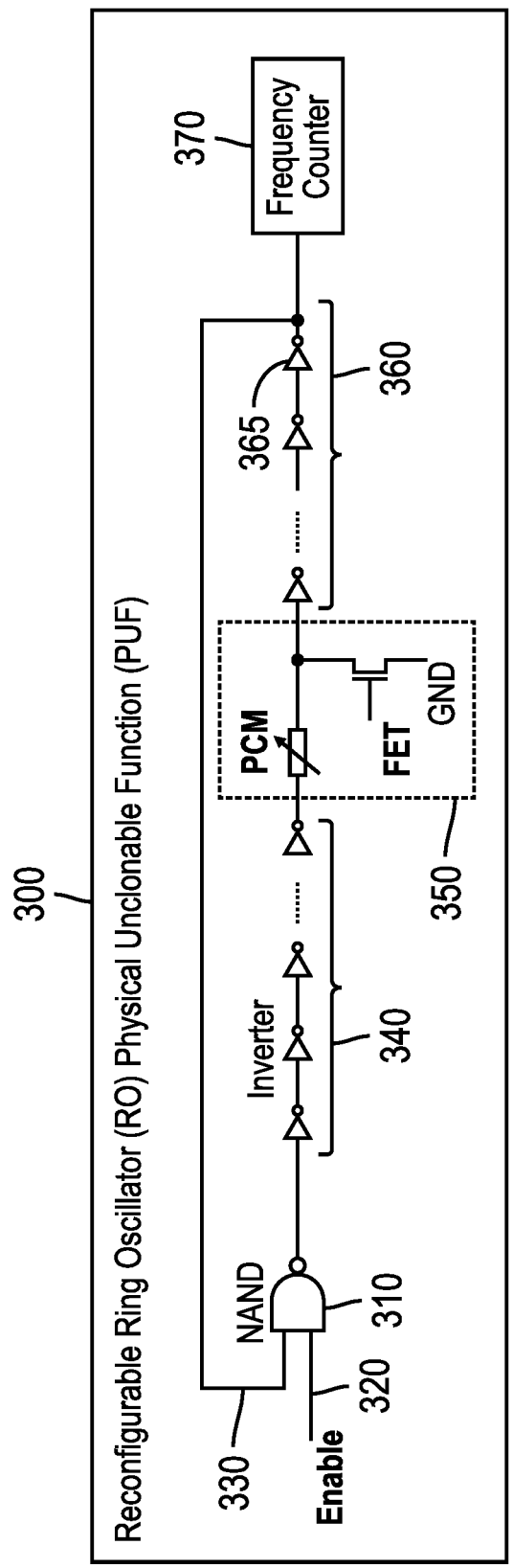
FIG. 3 illustrates a reconfigurable RO PUF in accordance with certain embodiments.

FIG. 3 illustrates a reconfigurable RO PUF 300 in accordance with certain embodiments. In FIG. 3, the reconfigurable RO PUF 300 comprises circuitry with a NAND gate 310 with a first input line of Enable 320 (an "Enable port") and a second input line 330 (i.e., another port). The output of the NAND gate 310 is input to a series of inverters 340, a memory cell 350 (i.e., a PCM cell), and another series of inverters 360. The output of the last inverter 365 in the series of inverters 360 loops back as input to the second input line 330 of the NAND gate 310. The output of the last inverter 365 in the series of inverters 360 also is input to the frequency counter 370.

That is, the reconfigurable RO PUF 300 (a "PCM-RO") consists of a ring oscillator with an odd number of inverters 340, 360 (e.g., an even number of inverters 340, 360 in series with a NAND gate 310) and a memory cell 350 (i.e., a PCM with an FET) inserted into the ring oscillator. The ring oscillator may be described as a circuit comprised of a series of inverters 340, 360 where the output is fed back as input to the second input line 330 of the NAND gate 310. The frequency of the ring oscillator depends on the resistance of the PCM cell 350 and the delay of each inverter 340, 360. Depending on the frequency of the ring oscillator, the reconfigurable RO PUF 300 may produce a logic bit of "1" or "0".

In certain embodiments, the FET is used to program the PCM. During the normal PUF operation, the FET is off, so it has a minimal effect on the reconfigurable RO PUF. To reconfigure the reconfigurable RO PUF, the FET is on to change the resistance of the PCM.

Figure 4:
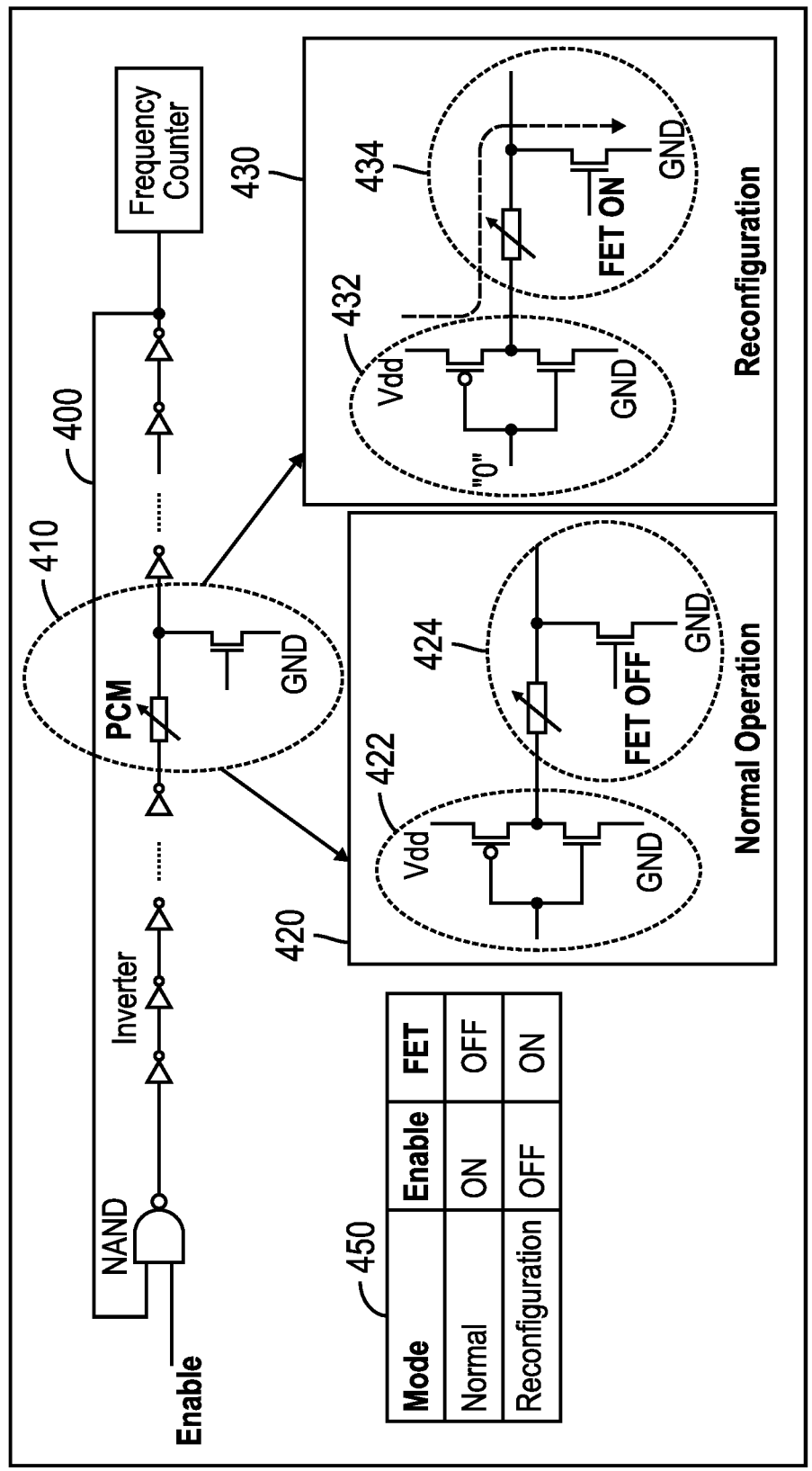
FIG. 4 illustrates modes of the reconfigurable RO PUF in accordance with certain embodiments.

FIG. 4 illustrates modes of the reconfigurable RO PUF in accordance with certain embodiments. For the reconfigurable RO PUF 400, there is a normal operation mode and a reconfiguration mode. Table 450 indicates whether the Enable port or the FET is one or off for each mode. In certain embodiments, the reconfigurable RO PUF 400 operates in normal operation mode for most of the time. Circuitry 410 (with an inverter and the PCM cell) is expanded as circuitry 420 (with inverter 422 and PCM cell 424) for the normal operation mode and circuitry 430 (with inverter 432 and PCM cell 434) in the reconfiguration operation mode.

In the normal operation mode, the Enable port of the NAND gate is ON (logic "1") to enable ring oscillation, while the programming FET of the PCM cell is OFF (logic "0") so that no current flows through the PCM, except the transient current during inverter switching. In the reconfiguration mode, the Enable port of the NAND gate is OFF (logic "0") to turn off the ring oscillation, while the programming FET of the PCM cell is ON (logic "1"). By applying a programming pulse on the gate, current flows through the PCM to change its resistance and thus change the ring oscillation frequency, and this results in reconfiguring the reconfigurable RO PUF. That is, each inverter introduces a small amount (e.g., microscopic) delay, and those delays affect the resistance, and allowing current to flow through the PCM adds another small delay. That is, changing the resistance of the PCM with the program pulse results in a change in in the delay of the ring oscillator. In FIG. 4, Vdd represents the operating voltage of the chip, while GND represents ground and describes a return route of electrical current to the power source that enables the completion of the circuit.

A metal-oxide-semiconductor field-effect transistor (MOSFET) is a type of field-effect transistor (FET). An NFET (e.g., an n-type or n-channel MOSFET) passes a signal when given a "1", and a PFET (e.g., p-type or p-channel MOSFET) passes a signal when given a "0".

Figure 5:
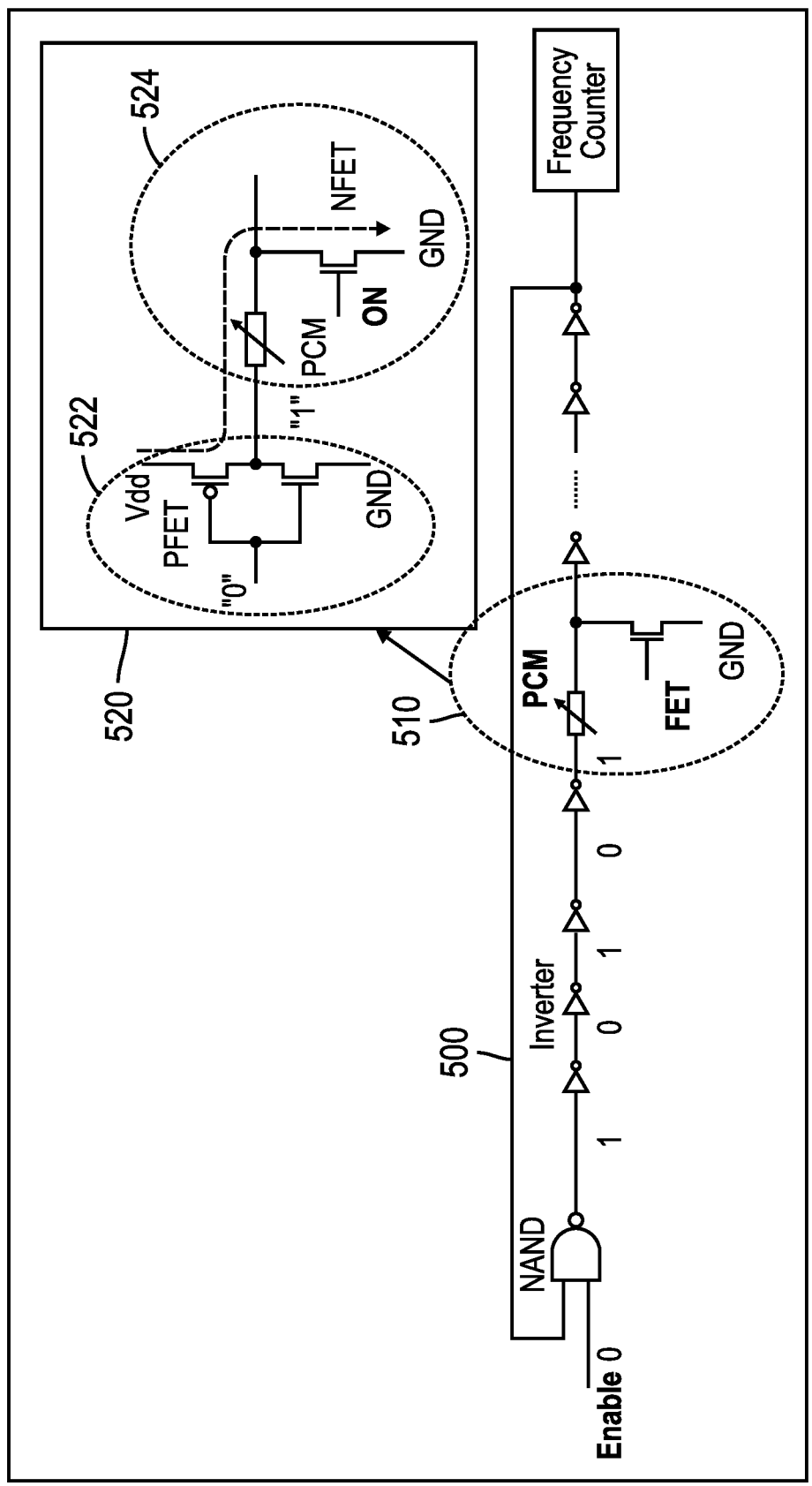
FIG. 5 illustrates an insertion point of a Phase Change Memory (PCM) cell in a ring oscillator in accordance with certain embodiments.

FIG. 5 illustrates an insertion point of a Phase Change Memory (PCM) cell in a ring oscillator in accordance with certain embodiments. In certain embodiments, the PCM cell is inserted into the ring oscillator between two inverters of the reconfigurable RO PUF 500. Circuitry 510 with the PCM cell is expanded as circuitry 520 with inverter 522 and PCM cell 524.

In certain embodiments, the reconfiguration of the reconfigurable RO PUF relies on programming the PCM when both the PFET of the inverter 520 and the programming NFET of the PCM cell 530 are ON. The programming NFET is turned on by applying an appropriate voltage (pulse) to its gate. The PFET in the inverter, however, may not have any direct contact. To ensure the PFET is on, its gate voltage is low (logic "0"). This may be achieved by setting the Enable port of the ring oscillator to "0" and placing the PCM cell in the right position of the ring oscillator, i.e., with an odd number of inverting elements (including the NAND gate and the inverters). For example, in the reconfigurable RO PUF 500, there are one NAND gate and four inverters between the Enable port and the PCM.

Figure 6:
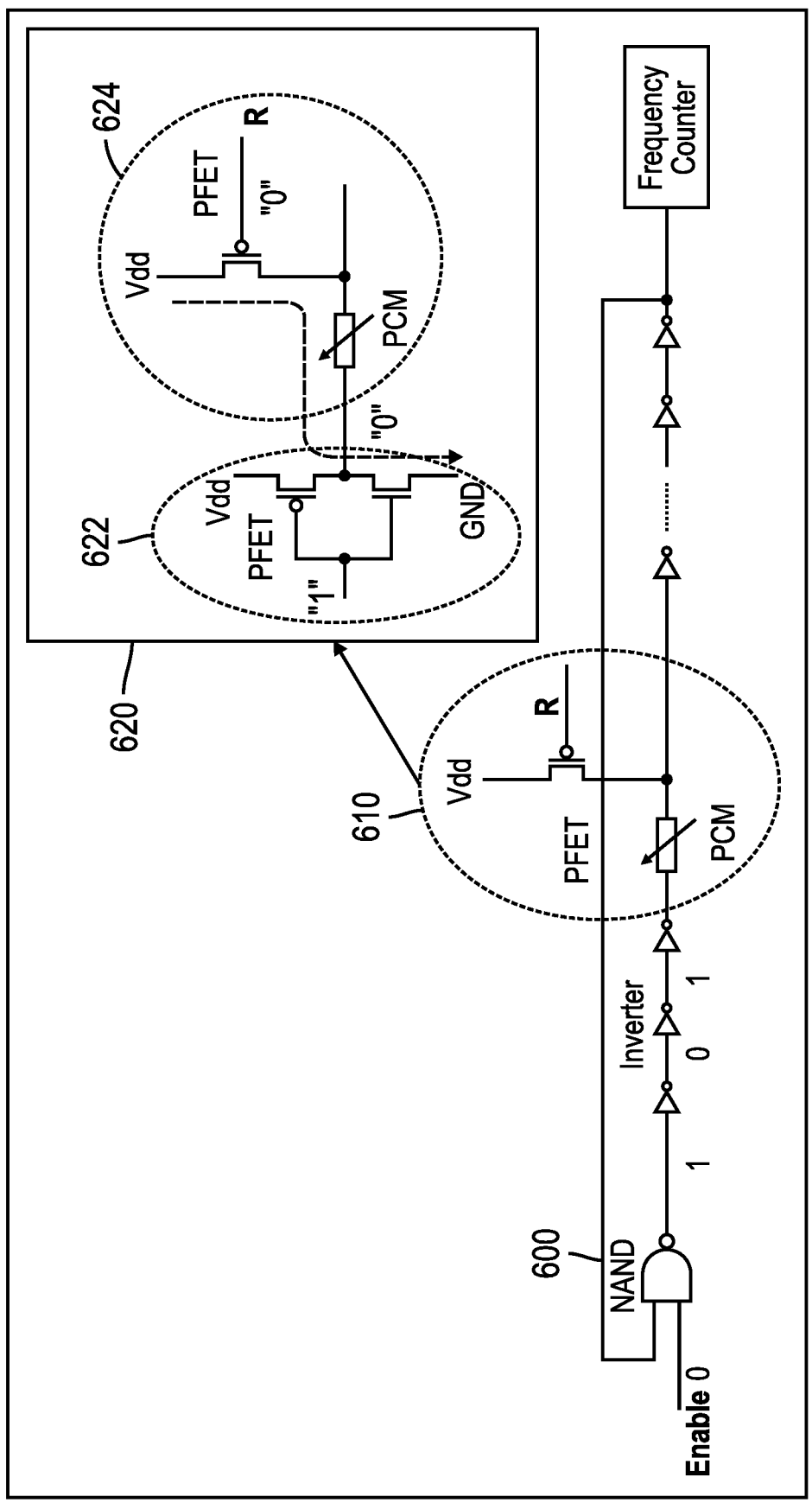
FIG. 6 illustrates use of a PFET as a programming device in accordance with certain embodiments.

FIG. 6 illustrates use of a PFET as a programming device in accordance with certain embodiments. In FIG. 6, for PFET as the programming device, the PCM cell is placed in the ring oscillator with an even number of inverting elements (including the NAND gate and the inverters) of the reconfigurable RO PUF 600. Circuitry 610 with an inverter and the PCM cell is expanded as circuitry 620 with inverter 622 and PCM cell 624.

In FIG. 6, there are one NAND gate and three inverters between the Enable port and the PCM. During normal operation, the programming node R is at logic high ("1") to turn off the programming PFET. During reconfiguration, a logic low ("0") is applied to node R (gate of PFET) turn on PFET.

Figure 7:
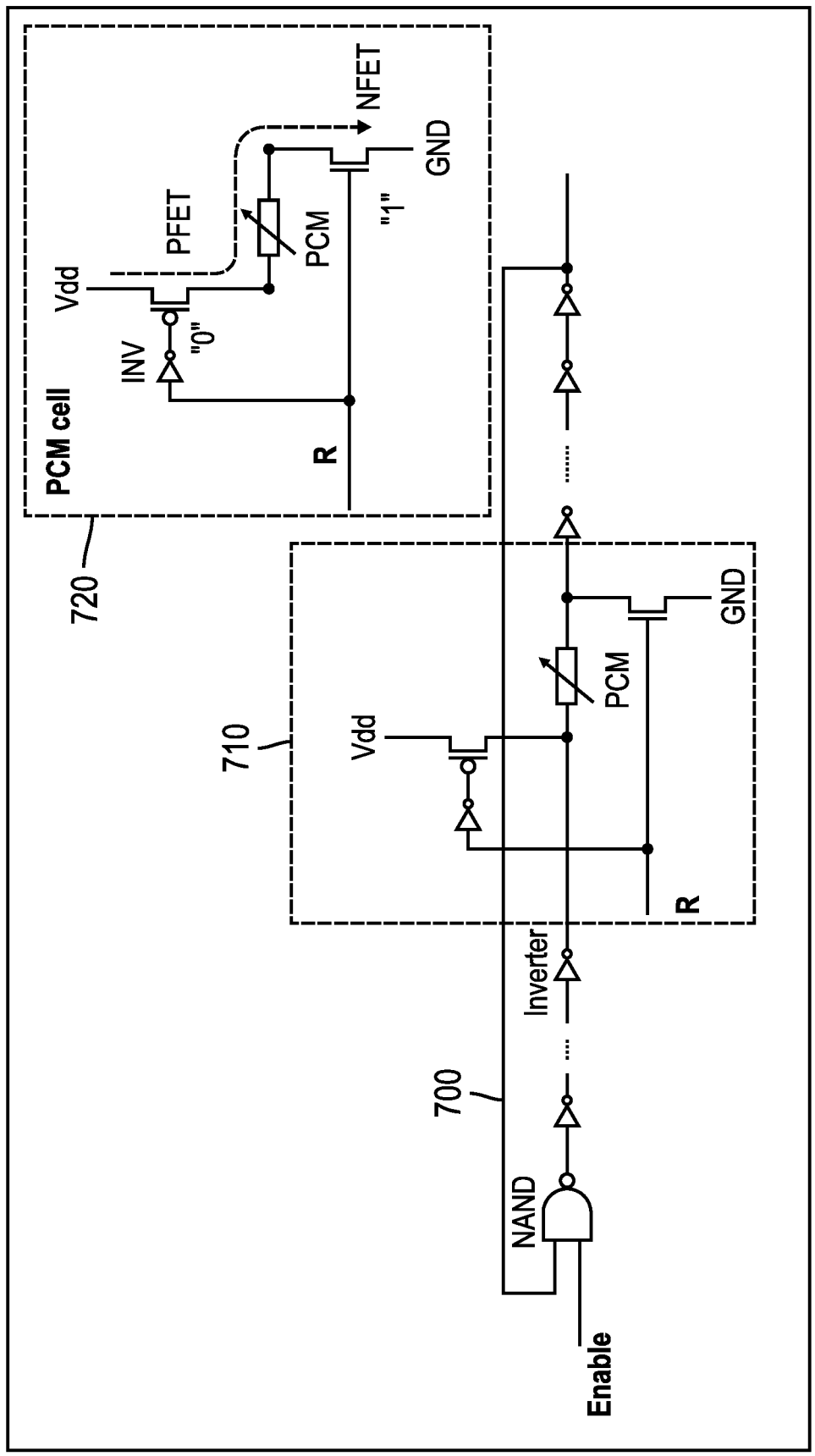
FIG. 7 illustrates use of an NFET and a PFET together as a programming device in accordance with certain embodiments.

FIG. 7 illustrates use of an NFET and a PFET together as a programming device in accordance with certain embodiments. Circuitry 710 of a PCM cell of the reconfigurable RO PUF 700 is expanded to circuitry 720 of the PCM cell. In certain embodiments, the PCM cell may be placed anywhere on the ring oscillator. This is achieved by using an NFET and a PFET together as the programming device. To program the PCM, a logic high ("1") is applied to node R to turn on both the NFET and the PFET. Note, the inverter (INV) between the NFET gate and the PFET gate is included to ensure that both NFET and PFET are ON or OFF at the same time. Then, current flows through the PCM to re-program it. During normal operation, a logic low ("0") is applied to node R to turn off both the NFET and the PFET.

Figure 8:
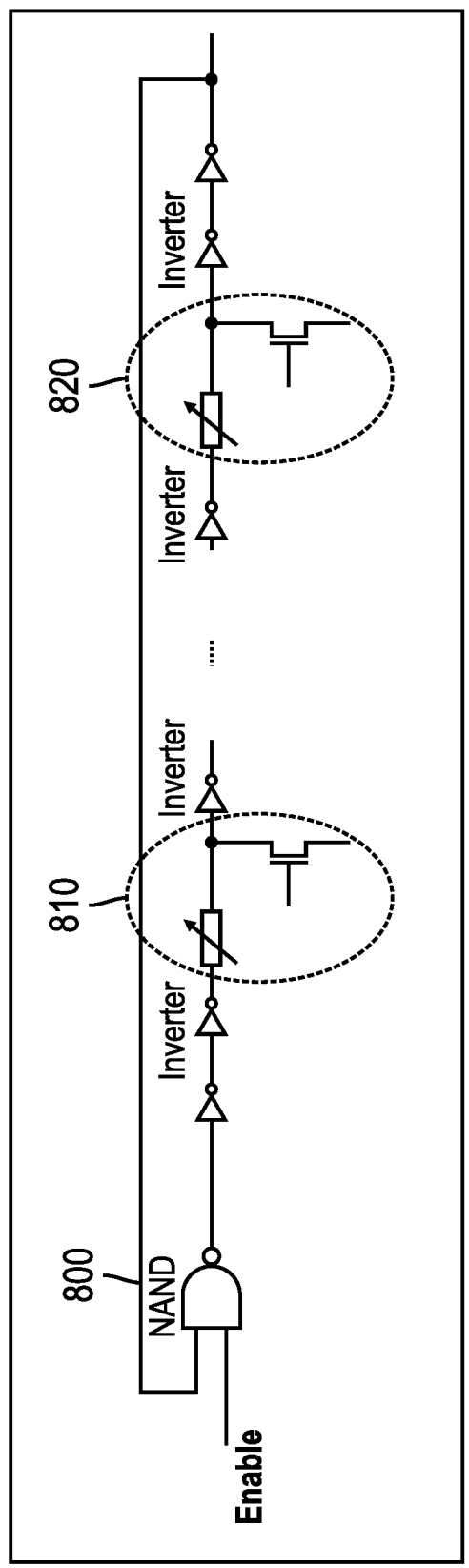
FIG. 8 illustrates use of multiple PCM cells inserted into the ring oscillator in accordance with certain embodiments.

FIG. 8 illustrates use of multiple PCM cells inserted into the ring oscillator in accordance with certain embodiments. In FIG. 8, the reconfigurable RO PUF 800 includes two PCM cells 810, 820.

Figure 9:
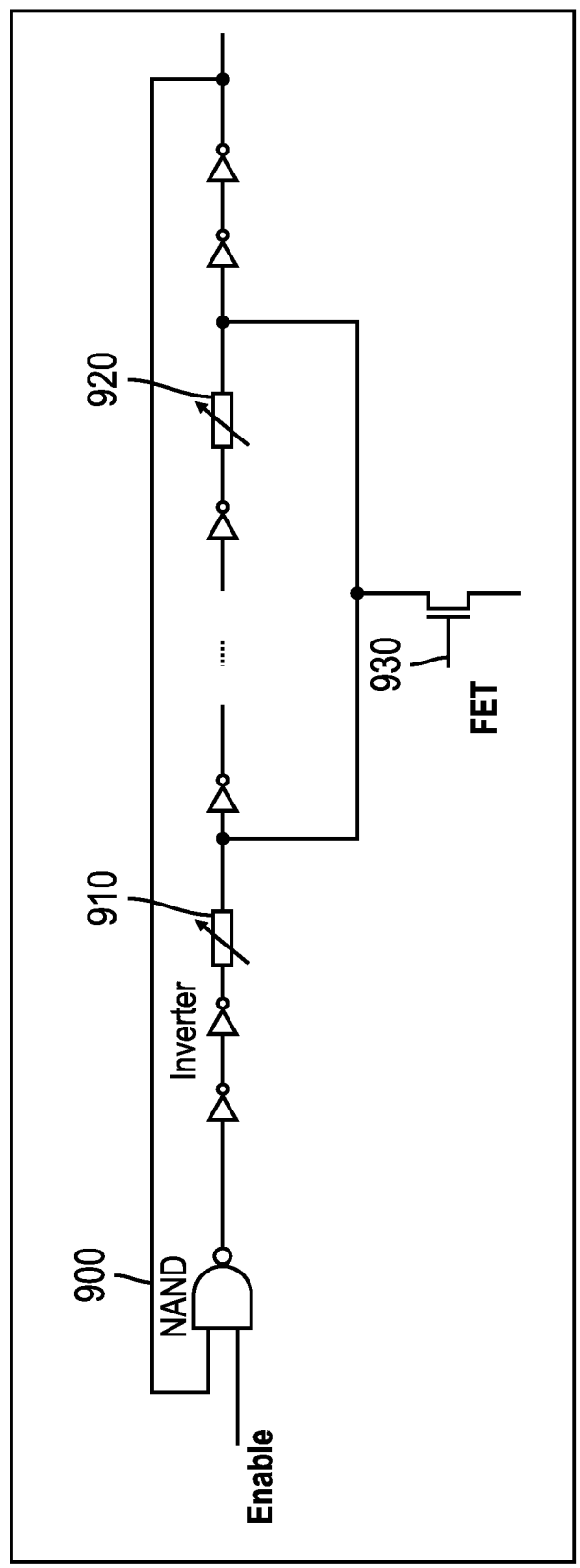
FIG. 9 illustrates multiple PCM cells that share an FET in accordance with certain embodiments.

FIG. 9 illustrates multiple PCM cells that share an FET in accordance with certain embodiments. In FIG. 9, the reconfigurable RO PUF 900 includes two PCM cells 910, 920, which share a single FET 930. Thus, instead of having a dedicated FET for each PCM cell, a common FET (large enough to deliver appropriate power) is used as the programming device to program multiple PCMs.

Figure 10:
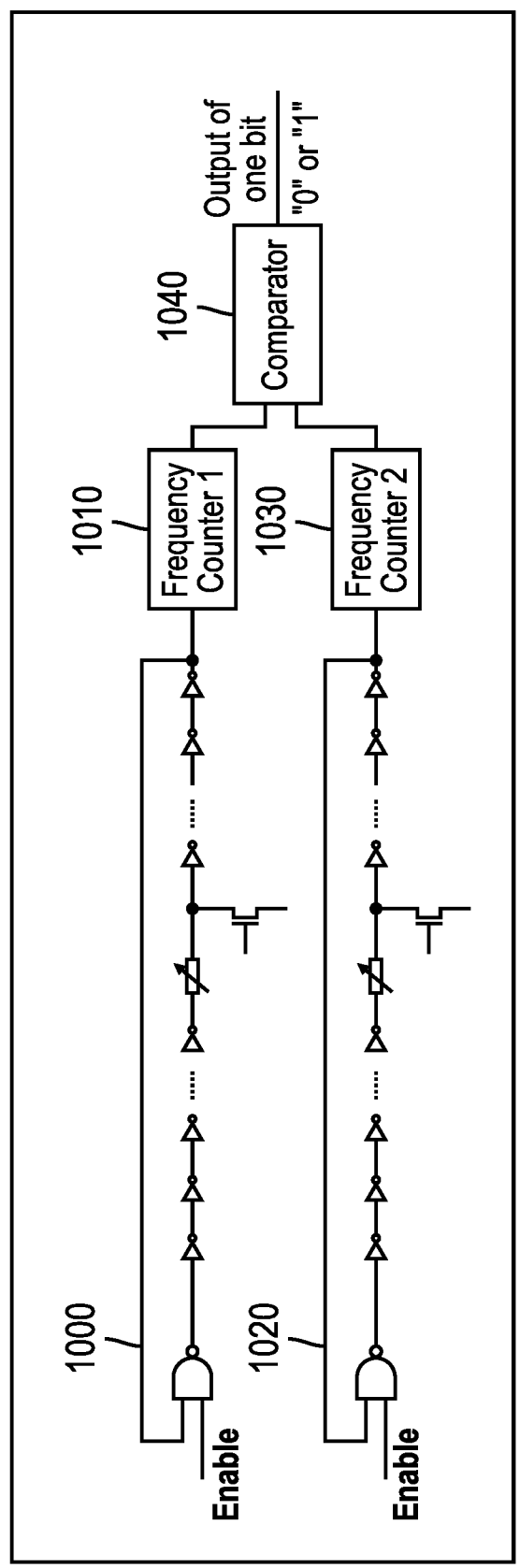
FIG. 10 illustrates circuitry with a pair of reconfigurable RO PUFs in accordance with certain embodiments.

FIG. 10 illustrates circuitry with a pair of reconfigurable RO PUFs in accordance with certain embodiments. A first reconfigurable RO PUF 1000 consists of a first NAND gate coupled to a series of inverters and a PCM cell, with the last inverter of the series coupled to a counter 1010. A second reconfigurable RO PUF 1020 consists of a second NAND gate coupled to a series of inverters and a PCM cell, with the last inverter of the series coupled to a counter 1030. The counters 110, 130 are coupled to a frequency counter 140 that outputs a single bit of zero or one. That is, a pair of the reconfigurable RO PUFs (i.e., a pair of ring oscillators with PCMs) are used to generate one bit of PUF. Each reconfigurable RO PUF 1000, 1020 has a frequency counter 1010, 1030 to count the frequency. The frequencies of the paired reconfigurable RO PUFs 1000, 1020 are compared. Depending on which reconfigurable RO PUF is faster, a logic state of "1" or "0" is output.

Figure 11:
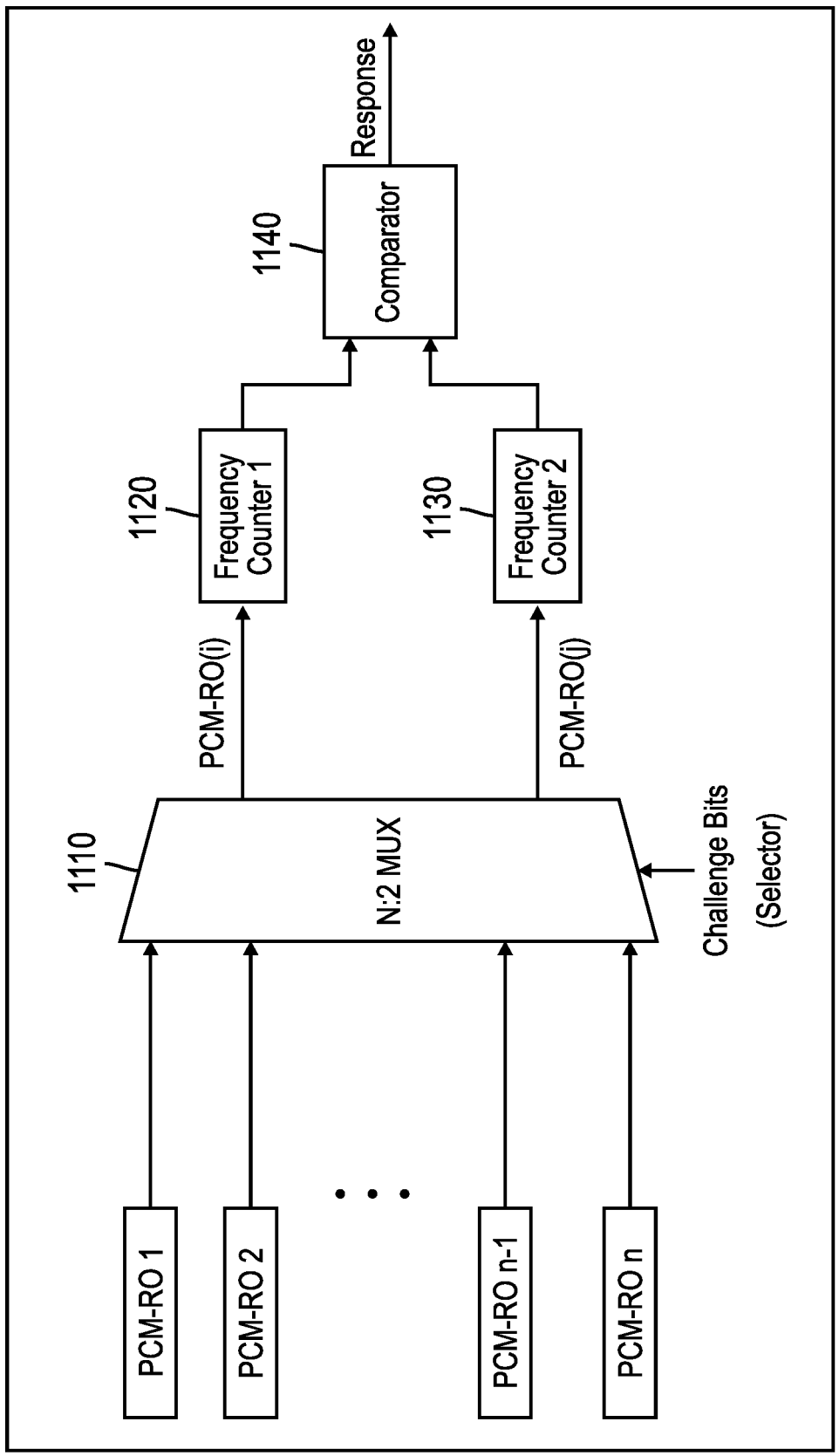
FIG. 11 illustrates a configuration with reconfigurable RO PUFs and a multiplexor (MUX) in accordance with certain embodiments.

FIG. 11 illustrates a configuration with reconfigurable RO PUFs and a multiplexor (MUX) in accordance with certain embodiments. In FIG. 11, there are 1-n reconfigurable RO PUFs (i.e., PCM-RO1, PCM-RO2 . . . . PCM-ROn-1, PCM-ROn). The N PCM-ROs connect to an N-to-2 multiplexer (N:2 MUX) 1110. The outputs of the MUX 1110 connect to frequency counters 1020, 1030. The output of each frequency counter 1020, 1030 connects to a comparator 1140.

For each authentication, a set of challenge bits are applied as the selector input to the MUX 1110. Depending on the challenge bits, different pairs of PCM-ROs are selected and outputs of the corresponding frequency counters 1120, 1130 are compared in the comparator 1140. Each comparison generates one-bit. Comparisons of k-pairs generate k-bits.

Figure 12:
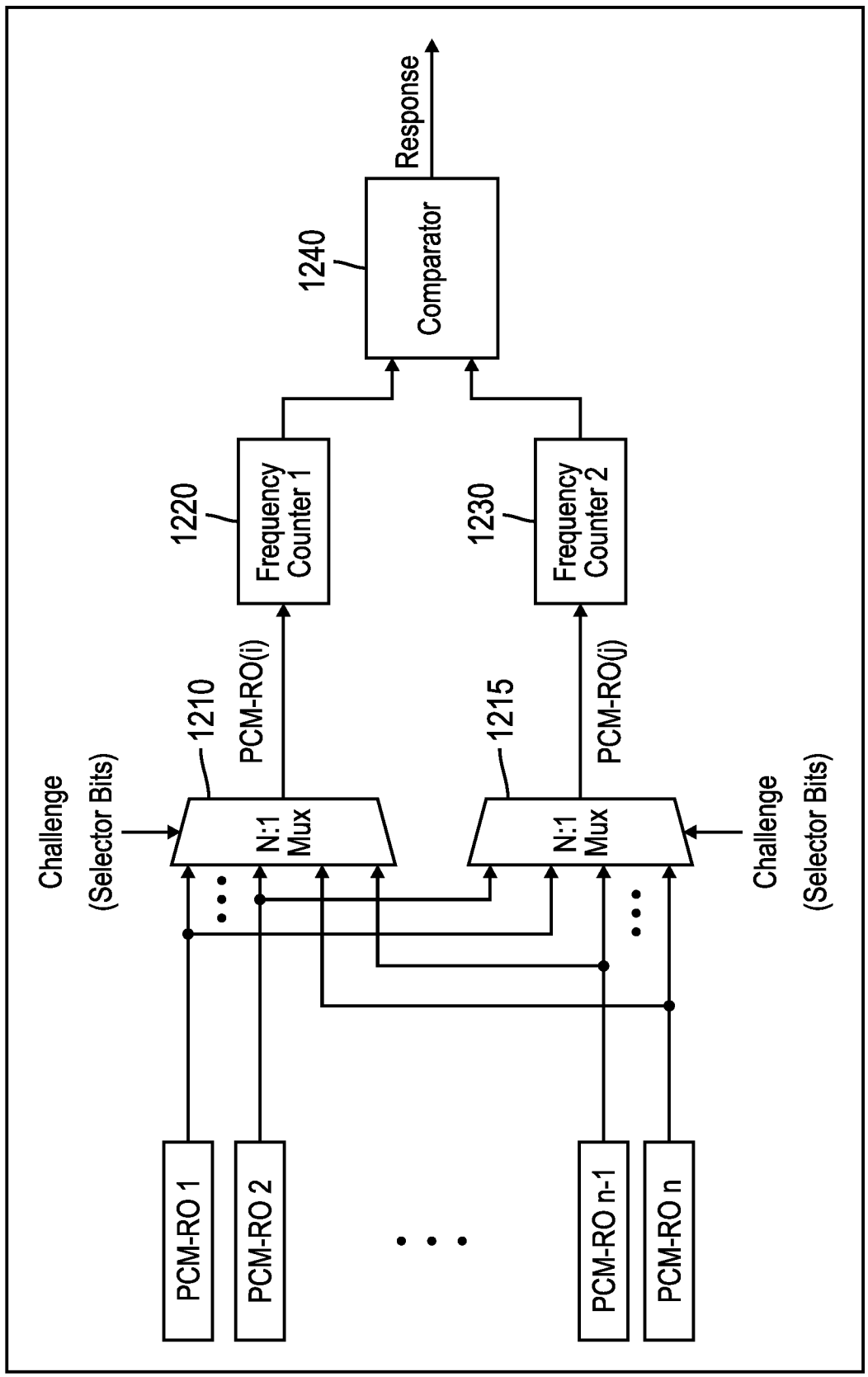
FIG. 12 illustrates a configuration with reconfigurable RO PUFs and two multiplexors in accordance with certain embodiments.

FIG. 12 illustrates a configuration with reconfigurable RO PUFs and two multiplexors in accordance with certain embodiments. In FIG. 12, there are 1-n reconfigurable RO PUFs (i.e., PCM-RO1, PCM-RO2 . . . . PCM-ROn-1, PCM-ROn). The group of PCM-ROs (i.e., N PCM-ROs) connect to two N-to-1 (N:1) multiplexers (MUXs) 1210, 1215 with different orders. The output of each MUX 1210, 1215 connects to a corresponding frequency counter 1220, 1230. The output of each frequency counter 1220, 1230 connects to a comparator 1240.

For each authentication, a set of challenge bits are applied as the selector input to the multiplexers. Depending on the challenge bits, different pairs of PCM-ROs are selected and outputs of the corresponding frequency counters 1220, 1230 are compared in the comparator 1240. Each comparison generates one-bit. Comparisons of k-pairs generate k-bits.

Thus, embodiments take advantage of large variability ("bad behavior") of memory elements (e.g., PCM, RRAM, etc.) to make an RO PUF reconfigurable. The reconfigurable RO PUF device may be integrated into analog computing without additional cost. The reconfigurable RO PUF entropy comes from two independent variability sources-enhancing entropy inverter delay and resistance variation of memory elements.

In certain embodiments, a reconfigurable RO PUF comprises a pair of cross-coupled ring oscillators. In such embodiments, the reconfigurable RO PUF may be used for applications other than random number generators.

Figure 13:
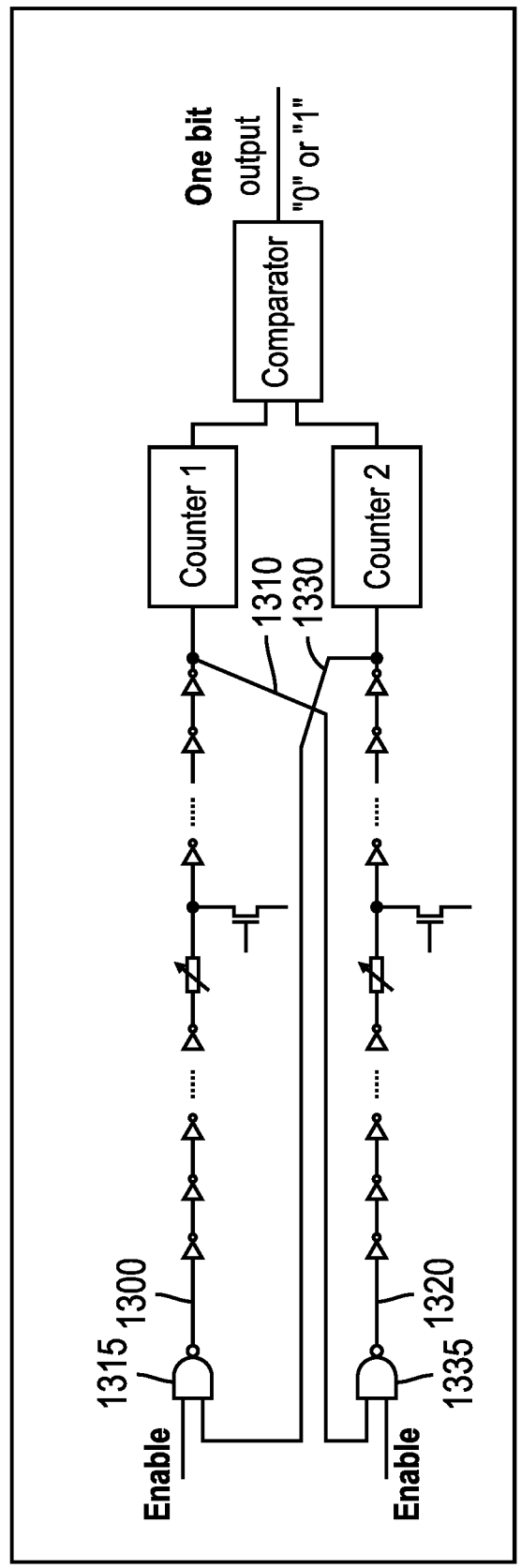
FIG. 13 illustrates a configuration with cross-coupled reconfigurable RO PUFs in accordance with certain embodiments.

FIG. 13 illustrates a configuration with cross-coupled reconfigurable RO PUFs in accordance with certain embodiments. In FIG. 13, a pair of the PCM-ROs 1300, 1320 are used to generate one bit of PUF. An output 1310 of PCM-RO 1300 is input to PCM-RO 1320 at the enable port 1335, and an output 1330 of PCM-RO 1320 is input to PCM-RO 1300 at the enable port 1315. Each PCM-RO 1300, 1320 has a frequency counter to count the frequency. The frequencies of the paired PCM-ROs 1300, 1320 are compared. Depending on which PCM-RO 1300, 1320 is faster, a logic state "1" or "0" is generated.

That is, for the pair of cross-coupled reconfigurable RO PUFs, where each reconfigurable RO PUF 1300, 1320 is comprised of a series of inverters and a memory cell, where an output of an intermediate stage of a first cross-coupled reconfigurable RO PUF from the pair of cross-coupled reconfigurable RO PUFs is coupled to an enable port of a second cross-coupled reconfigurable RO PUF from the pair of cross-coupled reconfigurable RO PUFs, and where an output of an intermediate stage of the second cross-coupled reconfigurable RO PUF from the pair of cross-coupled reconfigurable RO PUFs is coupled to an enable port of the first cross-coupled reconfigurable RO PUF from the pair of cross-coupled reconfigurable RO PUFs. In addition, a sampling unit coupled to the pair of cross-coupled reconfigurable RO PUFs is configured to sample the outputs of the pair of cross-coupled reconfigurable RO PUFs and to generate a random number.

In certain embodiments, an apparatus minimizes the frequency difference of a pair of reconfigurable RO PUFs with the output of an intermediate stage of the 1st reconfigurable RO PUF connecting to an enable port of the 2nd reconfigurable RO PUF, and the output of an intermediate stage of the 2nd reconfigurable RO PUF connecting to an enable port of the 1st reconfigurable RO PUF.

In certain embodiments, an apparatus generates a random number with a pair of cross-coupled reconfigurable RO PUFs and a signal sampling unit that samples the outputs of the reconfigurable RO PUFs pair and generates a random number. Such embodiments cover random number generator applications. The sampling unit may be a pair of counters and a comparator or an XOR gate. The random number generator may further comprise a control unit and a post processing unit for generating the random number. The random number generator output may feed into a pseudo random number generator.

Embodiments use a phase-change device or material (e.g., PCM or ReRAM) for creating the reconfigurable RO PUF. With embodiments, PCM or ReRAM devices and material are present on chips, which have analog AI functionality. The reconfigurable RO PUF functionality may be added without additional process cost.

Figure 14:
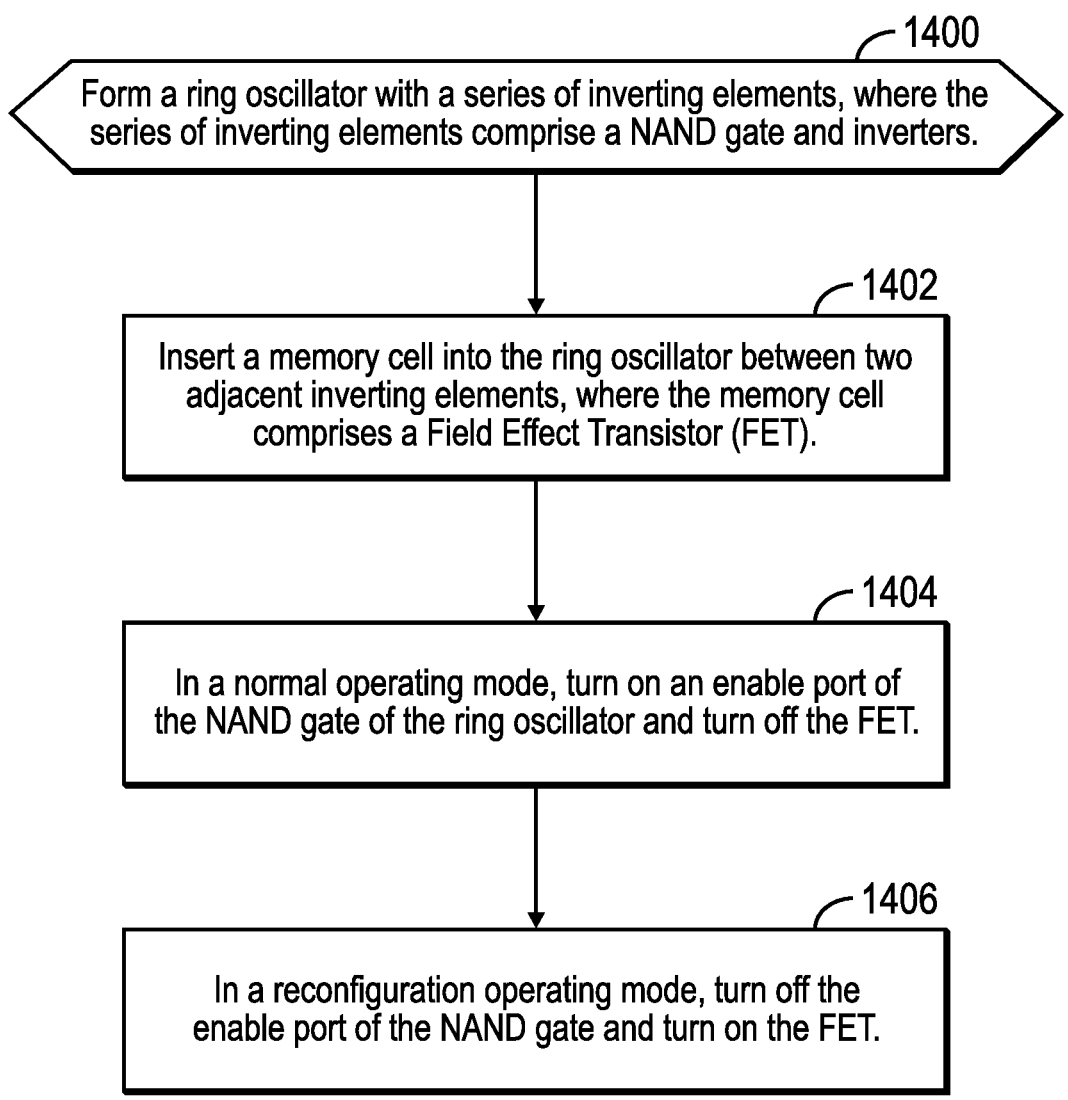
FIG. 14 illustrates, in a flowchart, operations for creating a reconfigurable RO PUF accordance with certain embodiments.

FIG. 14 illustrates, in a flowchart, operations for creating a reconfigurable RO PUF accordance with certain embodiments. Control begins at block 1400 with forming a ring oscillator with a series of inverting elements, wherein the series of inverting elements comprise a NAND gate and inverters. In block 1402, a memory cell is inserted into the ring oscillator between two adjacent inverting elements, where the memory cell comprises a Field Effect Transistor (FET). In block 1404, in a normal operating mode, an enable port of the NAND gate of the ring oscillator is turned on and the FET is turned off. In block 1406, in a reconfiguration operating mode, the enable port of the NAND gate is turned off and the FET is turned on.

Figure 15:
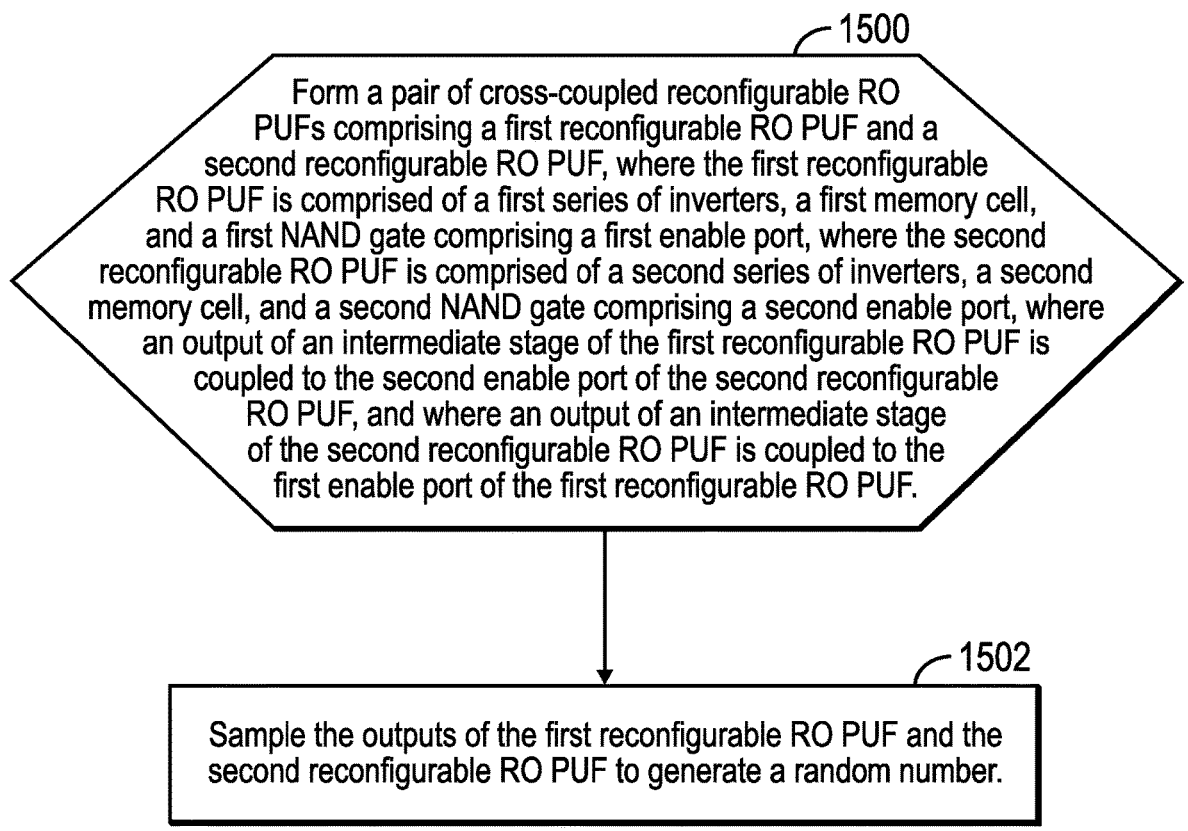
FIG. 15 illustrates, in a flowchart, operations for creating a reconfigurable RO PUF accordance with certain other embodiments.

FIG. 15 illustrates, in a flowchart, operations for creating a reconfigurable RO PUF accordance with certain other embodiments. Control begins at block 1500 with formation of a pair of cross-coupled reconfigurable RO PUFs comprising a first reconfigurable RO PUF and a second reconfigurable RO PUF, wherein the first reconfigurable RO PUF is comprised of a first series of inverters, a first memory cell, and a first NAND gate comprising a first enable port, wherein the second reconfigurable RO PUF is comprised of a second series of inverters, a second memory cell, and a second NAND gate comprising a second enable port, wherein an output of an intermediate stage of the first reconfigurable RO PUF is coupled to the second enable port of the second reconfigurable RO PUF, and wherein an output of an intermediate stage of the second reconfigurable RO PUF is coupled to the first enable port of the first reconfigurable RO PUF. In block 1502, the outputs of the first reconfigurable RO PUF and the second reconfigurable RO PUF are sampled to generate a random number.

Figure 16:
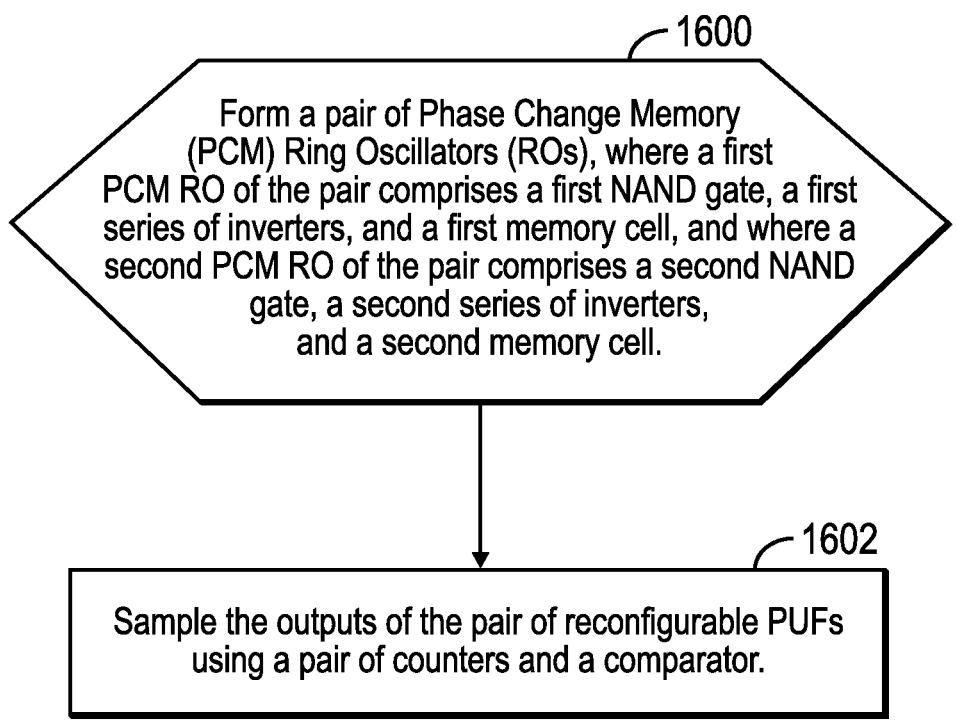
FIG. 16 illustrates, in a flowchart, operations for creating a reconfigurable RO PUF accordance with certain further embodiments.

FIG. 16 illustrates, in a flowchart, operations for creating a reconfigurable RO PUF accordance with certain further embodiments. Control begins at block 1600 with formation a pair of Phase Change Memory (PCM) Ring Oscillators (ROs), where a first PCM RO of the pair comprises a first NAND gate, a first series of inverters, and a first memory cell, and where a second PCM RO of the pair comprises a second NAND gate, a second series of inverters, and a second memory cell. In block 1602, the outputs of the pair of PCM ROs are sampled using a pair of counters and a comparator.

Thus, certain embodiments are directed to forming a ring oscillator with an odd number of inverting elements and inserting at least one memory cell (e.g., PCM cell or RRAM cell) between two adjacent inverting elements.

Certain embodiments are directed to a chain of inverting elements with at least one memory cell (e.g., PCM cell or RRAM cell) between two adjacent inverting elements.

In certain embodiments, a RO PUF with a memory element between two adjacent inverting elements of the RO forms a reconfigurable RO PUF.

The reconfigurable RO PUF is compatible with analog computing architecture and provides a cost-effective solution to secure cloud-based analog computing.

Various aspects of the present disclosure are described by narrative text, flowcharts, block diagrams of computer systems and/or block diagrams of the machine logic. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

Figure 17:
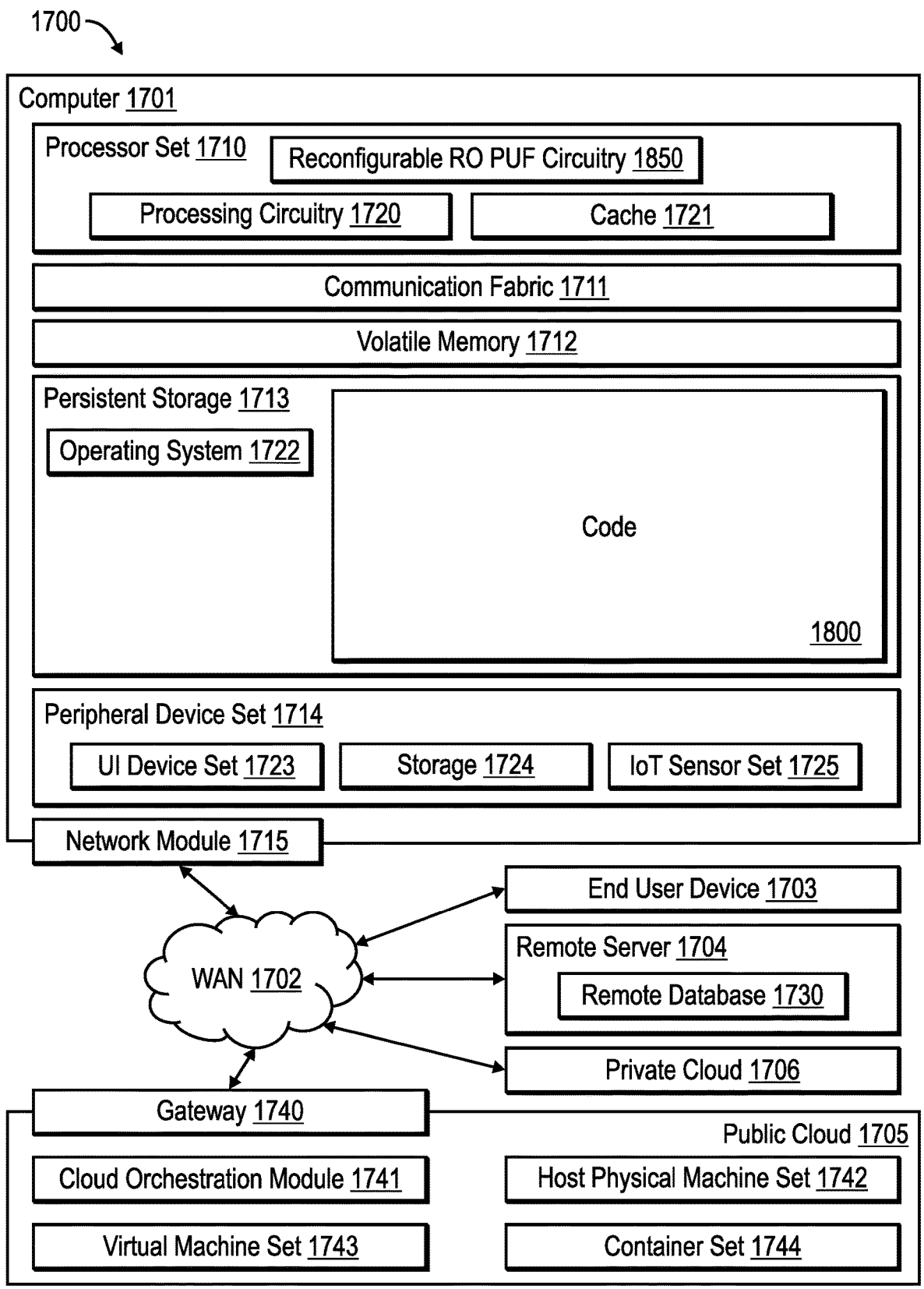
FIG. 17 illustrates a computing environment in accordance with certain embodiments.

FIG. 17 illustrates a computing environment 1700 in accordance with certain embodiments. Computing environment 1700 of contains an example of an environment for a reconfigurable RO PUF circuitry 1750. The reconfigurable PUF circuitry 1750 may include any combination of circuitry illustrated in FIGS. 2-13. The computing the execution of at least some computer code 1800. In addition to block 1800, computing environment 1700 includes, for example, computer 1701, wide area network (WAN) 1702, end user device (EUD) 1703, remote server 1704, public cloud 1705, and private cloud 1706. In this embodiment, computer 1701 includes processor set 1710 (including processing circuitry 1720, cache 1721, and reconfigurable RO PUF circuitry 1750), communication fabric 1711, volatile memory 1712, persistent storage 1713 (including operating system 1722 and block 1800, as identified above), peripheral device set 1714 (including user interface (UI) device set 1723, storage 1724, and Internet of Things (IoT) sensor set 1725), and network module 1715. Remote server 1704 includes remote database 1730. Public cloud 1705 includes gateway 1740, cloud orchestration module 1741, host physical machine set 1742, virtual machine set 1743, and container set 1744.

COMPUTER 1701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1730. As is well understood in the art of computer technology, and depending upon the technology, performance of a computer-implemented method may be distributed among multiple computers and/or between multiple locations. On the other hand, in this presentation of computing environment 1700, detailed discussion is focused on a single computer, specifically computer 1701, to keep the presentation as simple as possible. Computer 1701 may be located in a cloud, even though it is not shown in a cloud in FIG. 17. On the other hand, computer 1701 is not required to be in a cloud except to any extent as may be affirmatively indicated.

PROCESSOR SET 1710 includes one, or more, computer processors of any type now known or to be developed in the future. Processing circuitry 1720 may be distributed over multiple packages, for example, multiple, coordinated integrated circuit chips. Processing circuitry 1720 may implement multiple processor threads and/or multiple processor cores. Cache 1721 is memory that is located in the processor chip package(s) and is typically used for data or code that should be available for rapid access by the threads or cores running on processor set 1710. Cache memories are typically organized into multiple levels depending upon relative proximity to the processing circuitry. Alternatively, some, or all, of the cache for the processor set may be located "off chip." In some computing environments, processor set 1710 may be designed for working with qubits and performing quantum computing.

Computer readable program instructions are typically loaded onto computer 1701 to cause a series of operational steps to be performed by processor set 1710 of computer 1701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1721 and the other storage media discussed below. The program instructions, and associated data, are accessed by processor set 1710 to control and direct performance of the inventive methods. In computing environment 1700, at least some of the instructions for performing the inventive methods may be stored in block 1800 in persistent storage 1713.

COMMUNICATION FABRIC 1711 is the signal conduction path that allows the various components of computer 1701 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 1712 is any type of volatile memory now known or to be developed in the future. Examples include dynamic type random access memory (RAM) or static type RAM. Typically, volatile memory 1712 is characterized by random access, but this is not required unless affirmatively indicated. In computer 1701, the volatile memory 1712 is located in a single package and is internal to computer 1701, but, alternatively or additionally, the volatile memory may be distributed over multiple packages and/or located externally with respect to computer 1701.

PERSISTENT STORAGE 1713 is any form of non-volatile storage for computers that is now known or to be developed in the future. The non-volatility of this storage means that the stored data is maintained regardless of whether power is being supplied to computer 1701 and/or directly to persistent storage 1713. Persistent storage 1713 may be a read only memory (ROM), but typically at least a portion of the persistent storage allows writing of data, deletion of data and re-writing of data. Some familiar forms of persistent storage include magnetic disks and solid state storage devices. Operating system 1722 may take several forms, such as various known proprietary operating systems or open source Portable Operating System Interface-type operating systems that employ a kernel. The code included in block 1800 typically includes at least some of the computer code involved in performing the inventive methods.

PERIPHERAL DEVICE SET 1714 includes the set of peripheral devices of computer 1701. Data communication connections between the peripheral devices and the other components of computer 1701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1723 may include components such as a display screen, speaker, microphone, wearable devices (such as goggles and smart watches), keyboard, mouse, printer, touchpad, game controllers, and haptic devices. Storage 1724 is external storage, such as an external hard drive, or insertable storage, such as an SD card. Storage 1724 may be persistent and/or volatile. In some embodiments, storage 1724 may take the form of a quantum computing storage device for storing data in the form of qubits. In embodiments where computer 1701 is required to have a large amount of storage (for example, where computer 1701 locally stores and manages a large database) then this storage may be provided by peripheral storage devices designed for storing very large amounts of data, such as a storage area network (SAN) that is shared by multiple, geographically distributed computers. IoT sensor set 1725 is made up of sensors that can be used in Internet of Things applications. For example, one sensor may be a thermometer and another sensor may be a motion detector.

NETWORK MODULE 1715 is the collection of computer software, hardware, and firmware that allows computer 1701 to communicate with other computers through WAN 1702. Network module 1715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1715 are performed on the same physical hardware device. In other embodiments (for example, embodiments that utilize software-defined networking (SDN)), the control functions and the forwarding functions of network module 1715 are performed on physically separate devices, such that the control functions manage several different network hardware devices. Computer readable program instructions for performing the inventive methods can typically be downloaded to computer 1701 from an external computer or external storage device through a network adapter card or network interface included in network module 1715.

WAN 1702 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1703 is any computer system that is used and controlled by an end user (for example, a customer of an enterprise that operates computer 1701), and may take any of the forms discussed above in connection with computer 1701. EUD 1703 typically receives helpful and useful data from the operations of computer 1701. For example, in a hypothetical case where computer 1701 is designed to provide a recommendation to an end user, this recommendation would typically be communicated from network module 1715 of computer 1701 through WAN 1702 to EUD 1703. In this way, EUD 1703 can display, or otherwise present, the recommendation to an end user. In some embodiments, EUD 1703 may be a client device, such as thin client, heavy client, mainframe computer, desktop computer and so on.

REMOTE SERVER 1704 is any computer system that serves at least some data and/or functionality to computer 1701. Remote server 1704 may be controlled and used by the same entity that operates computer 1701. Remote server 1704 represents the machine(s) that collect and store helpful and useful data for use by other computers, such as computer 1701. For example, in a hypothetical case where computer 1701 is designed and programmed to provide a recommendation based on historical data, then this historical data may be provided to computer 1701 from remote database 1730 of remote server 1704.

PUBLIC CLOUD 1705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1705 is performed by the computer hardware and/or software of cloud orchestration module 1741. The computing resources provided by public cloud 1705 are typically implemented by virtual computing environments that run on various computers making up the computers of host physical machine set 1742, which is the universe of physical computers in and/or available to public cloud 1705. The virtual computing environments (VCEs) typically take the form of virtual machines from virtual machine set 1743 and/or containers from container set 1744. It is understood that these VCEs may be stored as images and may be transferred among and between the various physical machine hosts, either as images or after instantiation of the VCE. Cloud orchestration module 1741 manages the transfer and storage of images, deploys new instantiations of VCEs and manages active instantiations of VCE deployments. Gateway 1740 is the collection of computer software, hardware, and firmware that allows public cloud 1705 to communicate through WAN 1702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1706 is similar to public cloud 1705, except that the computing resources are only available for use by a single enterprise. While private cloud 1706 is depicted as being in communication with WAN 1702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1705 and private cloud 1706 are both part of a larger hybrid cloud.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A reconfigurable Ring Oscillator (RO) Physical Unclonable Function (PUF) comprising:
    a NAND gate with a first input line and a second input line;
    a series of inverters with at least one memory cell placed between two inverters of the series of inverters, wherein an output of a last inverter provides input to the second input line, and wherein the memory cell comprises a Field Effect Transistor (FET);
    a frequency counter, wherein the output of the last inverter provides input to the frequency counter; and
    wherein, in normal operation mode, the first input line is on to enable ring oscillation and the FET is off, and, wherein in reconfiguration mode, the first input line is off and the FET is on to enable reconfiguration.

2. The reconfigurable RO PUF of claim 1, wherein the memory cell comprises one of a Phase Change Memory (PCM) cell and a Resistive Random Access Memory (RRAM).

3. The reconfigurable RO PUF of claim 1, wherein the memory cell is placed after an odd number of inverters of the series of inverters.

4. The reconfigurable RO PUF of claim 1, wherein the memory cell is placed after an even number of inverters of the series of inverters.

5. The reconfigurable RO PUF of claim 1, wherein the memory cell comprises a first memory cell, and wherein a second memory cell is added to the series of inverters.

6. The reconfigurable RO PUF of claim 5, wherein the first memory cell and the second memory cell share the FET.

7. The reconfigurable RO PUF of claim 1, wherein the reconfigurable RO PUF comprises a first reconfigurable RO PUF, the frequency counter comprises a first frequency counter, and further comprising:
    a second reconfigurable RO PUF that comprises a second frequency counter; and
    a comparator that receives a first count from the first frequency counter and a second count from the second frequency counter, and wherein the comparator outputs a bit based on the first count and the second count.

8. The reconfigurable RO PUF of claim 1, wherein the reconfigurable RO PUF comprises a first reconfigurable RO PUF and further comprising:
    a multiplexor coupled to a plurality of reconfigurable RO PUFs including the first reconfigurable RO PUF and to a pair of frequency counters, wherein the multiplexor receives outputs from the plurality of reconfigurable PUFs and challenge bits from a selector, and wherein the multiplexor selects a pair of outputs based on the challenge bits to be sent to the pair of frequency counters;
    wherein the pair of frequency counters are coupled to the multiplexor and to a comparator, wherein each of the frequency counters in the pair receives an output of the selected pair of outputs from the multiplexor, and wherein each of the frequency counters in the pair outputs a count to the comparator; and
    wherein the comparator outputs a response based on the count from each of the frequency counters.

9. The reconfigurable RO PUF of claim 8, wherein the plurality of reconfigurable PUFs are coupled to two multiplexors.

10. An apparatus for a reconfigurable Ring Oscillator (RO) Physical Unclonable Function (PUF), comprising:
    a pair of cross-coupled reconfigurable RO PUFs comprising a first reconfigurable RO PUF and a second reconfigurable RO PUF, wherein the first reconfigurable RO PUF is comprised of a first series of inverters, a first memory cell, and a first NAND gate comprising a first enable port, wherein the second reconfigurable RO PUF is comprised of a second series of inverters, a second memory cell, and a second NAND gate comprising a second enable port, wherein an output of an intermediate stage of the first reconfigurable RO PUF is coupled to the second enable port of the second reconfigurable RO PUF, and wherein an output of an intermediate stage of the second reconfigurable RO PUF is coupled to the first enable port of the first reconfigurable RO PUF; and
    a sampling unit coupled to the pair of cross-coupled reconfigurable RO PUFs and configured to sample outputs of the first reconfigurable RO PUF and the second reconfigurable RO PUF to generate a random number.

11. A method for creating a reconfigurable Ring Oscillator (RO) Physical Unclonable Function (PUF), comprising operations for:
    forming a ring oscillator with a series of inverting elements, wherein the series of inverting elements comprise a NAND gate and inverters;
    inserting a memory cell into the ring oscillator between two adjacent inverting elements, wherein the memory cell comprises a Field Effect Transistor (FET);
    in a normal operating mode, turning on an enable port of the NAND gate of the ring oscillator and turning off the FET; and
    in a reconfiguration operating mode, turning off the enable port of the NAND gate and turn on the FET.

12. The method of claim 11, wherein the memory cell comprises one of a Phase Change Memory (PCM) cell and a Resistive Random Access Memory (RRAM).

13. The method of claim 11, wherein the memory cell is placed after an odd number of inverters of the series of inverting elements.

14. The method of claim 11, wherein the memory cell is placed after an even number of inverters of the series of inverting elements.

15. The method of claim 11, wherein the memory cell comprises a first memory cell, and wherein a second memory cell is added to the series of inverters.

16. The method of claim 15, wherein the first memory cell and the second memory cell share the FET.

17. The method of claim 11, further comprising operations for:
　sending an output of a last inverter in the series of inverting elements to an input line of the NAND gate and sending the output of the last inverter in the series of inverting elements to a frequency counter.

18. The method of claim 11, wherein the reconfigurable RO PUF comprises a first reconfigurable RO PUF, and further comprising:
　forming a pair of reconfigurable RO PUFs comprising the first reconfigurable RO PUF and a second reconfigurable RO PUF; and
　a comparator that receives a first count from a first frequency counter of the first reconfigurable RO PUF and a second count from a second frequency counter of the second reconfigurable RO PUF, and wherein the comparator outputs a bit based on the first count and the second count.

19. The method of claim 11, wherein the reconfigurable RO PUF comprises a first reconfigurable RO PUF, and wherein a plurality of reconfigurable RO PUFs including the first reconfigurable RO PUF are coupled to a multiplexor, and further comprising:
　receiving, at the multiplexor, outputs from the plurality of reconfigurable PUFs and challenge bits from a selector;
　selecting, at the multiplexor, a pair of outputs based on the challenge bits;
　sending, from the multiplexor, the pair of outputs to a pair of frequency counters;
　sending, from the pair of frequency counters, a pair of counts to a comparator; and
　outputting, at the comparator, a response based on the pair of counts.

20. The method of claim 19, wherein the plurality of reconfigurable PUFs are coupled to two multiplexors.

* * * * *